United States Patent Office 2,750,295
Patented June 12, 1956

2,750,295
PROCESS FOR MAKING UNICELLULAR DEHYDRATED POTATO GRANULES

Robert H. Treadway, Philadelphia, and Edward G. Heisler, Plymouth Meeting, Pa., assignors to United States of America as represented by the Secretary of Agriculture No Drawing. Application October 11, 1954,
Serial No. 461,692

2 Claims. (Cl. 99—207)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to dehydrated cooked potatoes.

Most of the many processes described in the technical literature for the dehydration of food materials may be classified under three types, depending on the method used for removing the water: (1) azeotropic distillation of water with an organic entraining agent; (2) extraction of water with a hydrophilic organic solvent; or (3) direct evaporation of the water.

For the azeotropic dehydration of potatoes, the various stringent requirements placed on the entraining agent effectively limit it to ethanol. This entrainer is reasonably efficient in removing water from cooked mashed potatoes containing high percentages of water but becomes progressively less effective as the water content is reduced. Hence, for the complete dehydration of potatoes by this method, excessive time and huge volumes of entraining agent are required, thus making the process uneconomical.

The main objection to the potato dehydration processes wherein the water is extracted with an organic solvent is that the aqueous-organic liquid dissolves a substantial portion of the potato solids. This soluble portion contains a large proportion of minerals, vitamins, amino acids and the like, which are valuable both for flavor and nutrition. This loss of soluble constituents varies with the particular solvent used and the degree to which the solvent is diluted with water. We have found that when using our preferred solvent, ethanol, if the solvent contains a high percentage of water it dissolves a larger proportion of potato solids but if it contains little water it dissolves little potato solids.

The principal difficulty encountered in the direct evaporation of water from cooked, mashed potatoes is in avoiding heat damage to the potato. Such damage results in a product darkened in color and having undesirable flavor alteration. Another major difficulty is in avoiding lumping or caking during the drying process, resulting in a non-uniform product that is difficult to reconstitute.

The object of this invention is to provide an economical and practical process for producing dehydrated mashed potatoes cotnaining substantially all the flavoring and valuable nutritional constituents of fresh mashed potatoes; that have suffered no significant heat damage or development of off-flavors; that are in the form of white, free-flowing, substantially unicellular granules; and that can be reconstituted almost instantly by addition of water or milk to yield mashed potatoes having substantially the appearance, texture, flavor and nutritional value of fresh mashed potatoes.

According to the invention, cooked mashed potatoes are partially dehydrated by adding ethanol to the mash and distilling therefrom a mixture of ethanol and water; further dehydration is then accomplished by adding ethanol to the mash and filtering therefrom a mixture of ethanol and water; and final dehydration is accomplished by evaporating residual ethanol and water from the filter cake obtained in the previous step.

It is advantageous to use substantially anhydrous (absolute) ethanol rather than the alcohol-water azeotrope containing about 5 percent of water, although the latter can be used.

In general, sufficient ethanol is added to the cooked, mashed potatoes to make a fluid slurry, usually about one part by weight of ethanol to two parts of potato. The slurry is then placed in a suitable distillation or vapor-liquid contacting apparatus and a mixture of ethanol and water is distilled out, condensed, and recovered. The apparatus is operated under a reduced pressure such that the temperature is kept about 50 to 55° C. and the slurry boils during the distillation. Efficient agitation must be provided to prevent caking and to facilitate removal of the water. During the distillation, fluidity of the slurry should be maintained by the intermittent or continuous addition of ethanol to replace the fluid distilled out. This ethanol may be added to either liquid or vapor form. The latter is more efficient, provided that the vapor is well dispersed in the slurry and thus is brought into intimate contact with the potato substance.

The distillation apparatus should be such as to minimize or avoid any fractionating effect. Fractional distillation would tend to produce the azeotropic composition in the distillate and, since this azeotrope contains only about 5 percent of water, would require an inordinately large volume of distillate to entrain a given amount of water. It has been observed that by avoiding any fractionation the distillate may contain 20 percent, or more, of water.

The percentage of water in the distillate steadily decreases as the dehydration proceeds (in a batch-wise operation); hence it is impractical to use this method to remove all the water required to be removed from the potatoes. While it is impossible to fix an arbitrary point at which it is most advantageous to end the distillation step and proceed with the filtration step, it is usually preferred to continue the distillation until about 60 percent of the water originally present in the slurry has been distilled.

The successful operation of the second, or filtration, step of the process requires that the liquid phase of the slurry to be filtered contain at least about 80 percent of ethanol. If the ethanol content is below about 80 percent, excessive amounts of soluble potato solids are removed in the filtrate. This required concentration is attained by addition of the necessary amount of alcohol. The slurry is then thoroughly mixed before being filtered. The filtrate contains about 20 percent of water and accounts for about 35 percent of the water originally present in the potatoes.

The filter cake can be reduced to a free-flowing, substantially unicellular powder by gently agitating it under a stream of air or under reduced pressure to remove residual ethanol. Heat should not be applied before substantially all the ethanol has been removed, since heat retards rather than accelerates evaporation of the ethanol.

The powder remaining after removal of the ethanol typically contains about 11 percent moisture and must be further dried to not more than about 7 percent moisture if the product is to be stable in ordinary storage. This final drying can be accomplished by any convenient process provided temperatures of about 60 to 80° C. are used. Temperatures above this point, if of more than a few minutes duration, cause discoloration and flavor damage to the granules. Suitable driers for this final step include kiln, shelf, tunnel, air-lift, and continuous belt driers.

One mode of carrying out the invention is more particularly described in the following illustrative example:

*Example*

One kilogram of cooked, mashed potatoes containing 20 percent of solids and 80 percent of water was diluted with 500 g. of ethanol and placed in a rotating vacuum evaporator of the type described in Anal. Chem., 22, 1462 (1950). The evaporator was then operated at a temperature of about 50° C. and a pressure adjusted to maintain steady boiling of the slurry (about 75 mm.). During the course of the evaporation the weight of the slurry was maintained substantially constant by frequent addition of ethanol to replace the liquid distilled.

Initially, the liquid portion of the slurry contained about 60 percent of water and yielded a distillate containing about 22 percent of water. The distillation was stopped when 60 percent of the total water present had been distilled, at which point the liquid portion of the slurry contained about 25 percent of water and yielded a distillate containing about 14 percent of water. The total distillate amounted to 2400 g. and contained 20 percent or 480 g. of water. Sufficient ethanol was then added to the slurry to bring the liquid portion of the slurry up to 80 percent alcohol, the mixture was well stirred and then filtered. The filtrate contained 1136 g. of ethanol and 284 g. of water, thus accounting for 35.5 percent of the water originally present in the potatoes. The filter cake was easily reduced to a loose, free-flowing, substantially unicellular powder by gentle stirring while exposed to the atmosphere. During this treatment 144 g. of ethanol and 12 g. of water evaporated from the granules. Application of heat during the evaporation of the alcohol from the granules should be avoided because it causes the granules to have an increased affinity for alcohol, thus retarding rather than accelerating evaporation of alcohol. The alcohol evaporated during this step may be recovered by conducting the evaporation in a closed vessel through which a current of air is passed or which is operated under vacuum. In either case an efficient condenser should be provided to condense the alcohol vapor.

When all alcohol had been removed from the granules they still retained about 11 percent moisture. For stable storage of the product this should be reduced to not more than about 7 percent. This was conveniently done by placing the granules in shallow trays in a forced draft oven at about 60° C. Any conventional dryer may be used provided heat damage to the granules is avoided. Temperatures above about 80° C. for more than a short time cause darkening of color and impairment of flavor in the product.

The granules produced as described above were unaffected by storage for many months at room temperature. They could be instantly reconstituted by stirring into the proper amount of milk or water, either warm or at room temperature, to yield mashed potatoes having substantially the same appearance, texture, flavor, and nutritional value as fresh mashed potatoes.

The ethanol used in the process was readily recovered by combining the various distillates and filtrates and fractionally distilling the ethanol as the alcohol-water azeotrope. The latter containing about 95 percent alcohol, was converted to absolute by any of the various known processes.

We claim:

1. The process for making dehydrated, substantially unicellular, potato granules comprising mixing about one part of ethanol with two parts of cooked, mashed potatoes thus to form a fluid slurry; distilling a mixture of ethanol and water from said slurry at a temperature of about 50 to 55° C. and under a reduced pressure such that the slurry boils at the operating temperature, ethanol being added during the distillation to replace the fluid removed by distillation, said distillation being continued until about 60 percent of the water in the original slurry has been distilled; then adding ethanol to the slurry until the liquid fraction of the slurry contains at least about 80 percent of ethanol; then filtering the slurry; then agitating the filter cake while permitting the ethanol therein to evaporate; and finally drying the potatoes to a moisture content of not more than about 7 percent at a temperature of about 60 to 80° C.

2. The process for making dehydrated, substantially unicellular, potato granules comprising mixing about one part of ethanol with two parts of cooked, mashed potatoes, thus to form a fluid slurry; distilling ethanol and water from said slurry at a temperature of about 50° C. and a pressure of about 75 mm. while replacing the fluid distilled from the slurry with added ethanol, said distillation being interrupted when about 60 percent of the water originally in the slurry has been distilled; adding ethanol to the slurry until the liquid portion thereof contains about 80 percent of ethanol, and then filtering the slurry; stirring the filter cake at substantially room temperature and while exposed to a current of air until substantially all ethanol has been removed therefrom; and finally, drying the potato granules thus obtained to a moisture content of about 7 percent in air at about 60° C.

References Cited in the file of this patent

UNITED STATES PATENTS 2,704,260     Heisler et al.             Mar. 15, 1955